(12) United States Patent
Bartfai-Walcott et al.

(10) Patent No.: US 11,962,644 B2
(45) Date of Patent: Apr. 16, 2024

(54) RESOURCE ORCHESTRATION BROKERAGE FOR INTERNET-OF-THINGS NETWORKS

(71) Applicant: Intel Corporation, Santa Clara, CA (US)

(72) Inventors: Katalin Klara Bartfai-Walcott, EL Dorado Hills, CA (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 16/302,069

(22) PCT Filed: Jul. 2, 2016

(86) PCT No.: PCT/US2016/040897
§ 371 (c)(1),
(2) Date: Nov. 15, 2018

(87) PCT Pub. No.: WO2018/009159
PCT Pub. Date: Jan. 11, 2018

(65) Prior Publication Data
US 2019/0149599 A1 May 16, 2019

(51) Int. Cl.
*H04L 67/1008* (2022.01)
*H04L 65/40* (2022.01)
(Continued)

(52) U.S. Cl.
CPC .......... *H04L 67/1008* (2013.01); *H04L 65/40* (2013.01); *H04L 67/12* (2013.01); *H04L 67/125* (2013.01)

(58) Field of Classification Search
CPC ..... H04L 67/1008; H04L 29/08; H04L 67/12; H04L 67/125
See application file for complete search history.

(56) References Cited

U.S. PATENT DOCUMENTS

| 8,539,074 B2 | 9/2013 | Bartfai-Walcott et al. |
|---|---|---|
| 8,745,233 B2 | 6/2014 | Bartfai-Walcott et al. |

(Continued)

FOREIGN PATENT DOCUMENTS

| CN | 101401369 A | 4/2009 |
|---|---|---|
| CN | 102869003 A | 1/2013 |

(Continued)

OTHER PUBLICATIONS

Kyasanur et al., Multi-Channel Wireless Networks: Capacity and Protocols*, Apr. 2005, University of Illinois at Urbana-Champaign, 20 pages (Year: 2005).*

(Continued)

*Primary Examiner* — John A Follansbee
*Assistant Examiner* — Raqiul A Choudhury
(74) *Attorney, Agent, or Firm* — Alliance IP, LLC

(57) ABSTRACT

In one embodiment, an apparatus comprises circuitry, wherein the circuitry is configured to: receive, via a communications network, context information for a first set of one or more edge devices, wherein the context information identifies an operating environment of the first set of edge devices based on information from one or more sensors; receive, via the communications network, workload information for a second set of one or more edge devices; determine workload assignments for the first set of edge devices based on the context information for the first set of edge devices and based on the workload information for the second set of edge devices; and transmit, via the communications network, the workload assignments to the first set of edge devices.

20 Claims, 10 Drawing Sheets

(51) Int. Cl.
    *H04L 67/12*   (2022.01)
    *H04L 67/125*  (2022.01)

(56) References Cited

U.S. PATENT DOCUMENTS

| | | | |
|---|---|---|---|
| 8,868,749 B2 | 10/2014 | Bartfai-Walcott et al. | |
| 9,258,765 B1 | 2/2016 | daCosta | |
| 9,313,107 B2 | 4/2016 | Bartfai-Walcott et al. | |
| 2007/0150589 A1* | 6/2007 | Kim | G06F 8/60 709/224 |
| 2009/0132649 A1 | 5/2009 | Hubbard | |
| 2009/0164533 A1 | 6/2009 | Hubbard | |
| 2013/0212212 A1 | 8/2013 | Addepalli et al. | |
| 2014/0192717 A1 | 7/2014 | Liu et al. | |
| 2014/0222730 A1 | 8/2014 | Vasseur et al. | |
| 2015/0127733 A1 | 5/2015 | Ding et al. | |
| 2015/0261876 A1 | 9/2015 | Trikha et al. | |
| 2015/0269510 A1 | 9/2015 | Campos et al. | |
| 2016/0014140 A1* | 1/2016 | Akireddy | H04L 63/105 726/1 |
| 2016/0085594 A1* | 3/2016 | Wang | H04L 67/18 709/226 |
| 2016/0140359 A1 | 5/2016 | Mukherjee et al. | |
| 2016/0248871 A1* | 8/2016 | Seed | H04L 67/2809 |
| 2017/0195424 A1* | 7/2017 | Nasir | H04L 67/36 |
| 2017/0235585 A1* | 8/2017 | Gupta | G06F 9/45558 718/1 |
| 2017/0257303 A1* | 9/2017 | Boyapalle | H04L 67/1002 |
| 2017/0329808 A1* | 11/2017 | Lachman | H04W 4/38 |

FOREIGN PATENT DOCUMENTS

| | | |
|---|---|---|
| CN | 104012149 A | 8/2014 |
| CN | 105075224 A | 11/2015 |
| CN | 105359095 A | 2/2016 |
| CN | 105393272 A | 3/2016 |
| EP | 2812801 A1 | 12/2014 |
| KR | 20160009618 A | 1/2016 |
| WO | 2015164359 A1 | 10/2015 |

OTHER PUBLICATIONS

International Preliminary Report on Patentability for Application No. PCT/US2016/040897, dated Jan. 8, 2019, 9 pages.
International Search Report for dated Mar. 30, 2017, for PCT/US2016/040897, 7 pages.
Written Opinion of the International Searching Authority dated Mar. 30, 2017, for PCT/US2016/040897, 7 pages.
SIPO; First Office Action issued in CN Patent Application No. 201680086340.8, dated Apr. 6, 2021; 14 pages including English translation.
Datta, Soumya Kanti, et al.; "Fog Computing Architecture to Enable Consumer Centric Internet of Things Services," International Symposium on Consumer Electronics (ISCE), Jun. 2015; 3 pages.
SIPO; Notice of Allowance issued in CN Patent Application No. 201680086340.8, dated Jan. 6, 2022; 7 pages including English translation.

* cited by examiner

RESOURCE ORCHESTRATION BROKERAGE FOR INTERNET-OF-THINGS NETWORKS

CROSS-REFERENCE TO RELATED APPLICATIONS

This application is a national stage application under 35 U.S.C. § 371 of PCT International Application Serial No. PCT/US2016/040897, filed on Jul. 2, 2016, and entitled RESOURCE ORCHESTRATION BROKERAGE FOR INTERNET-OF-THINGS NETWORKS. The disclosure of the prior application is considered part of and is hereby incorporated by reference in its entirety in the disclosure of this application.

TECHNICAL FIELD

This disclosure relates in general to the field of computer systems and, more particularly, to a resource orchestration brokerage for Internet-of-Things networks.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, and watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet-of-Things (IoT).

DETAILED DESCRIPTION OF EXAMPLE EMBODIMENTS

Figure 1:
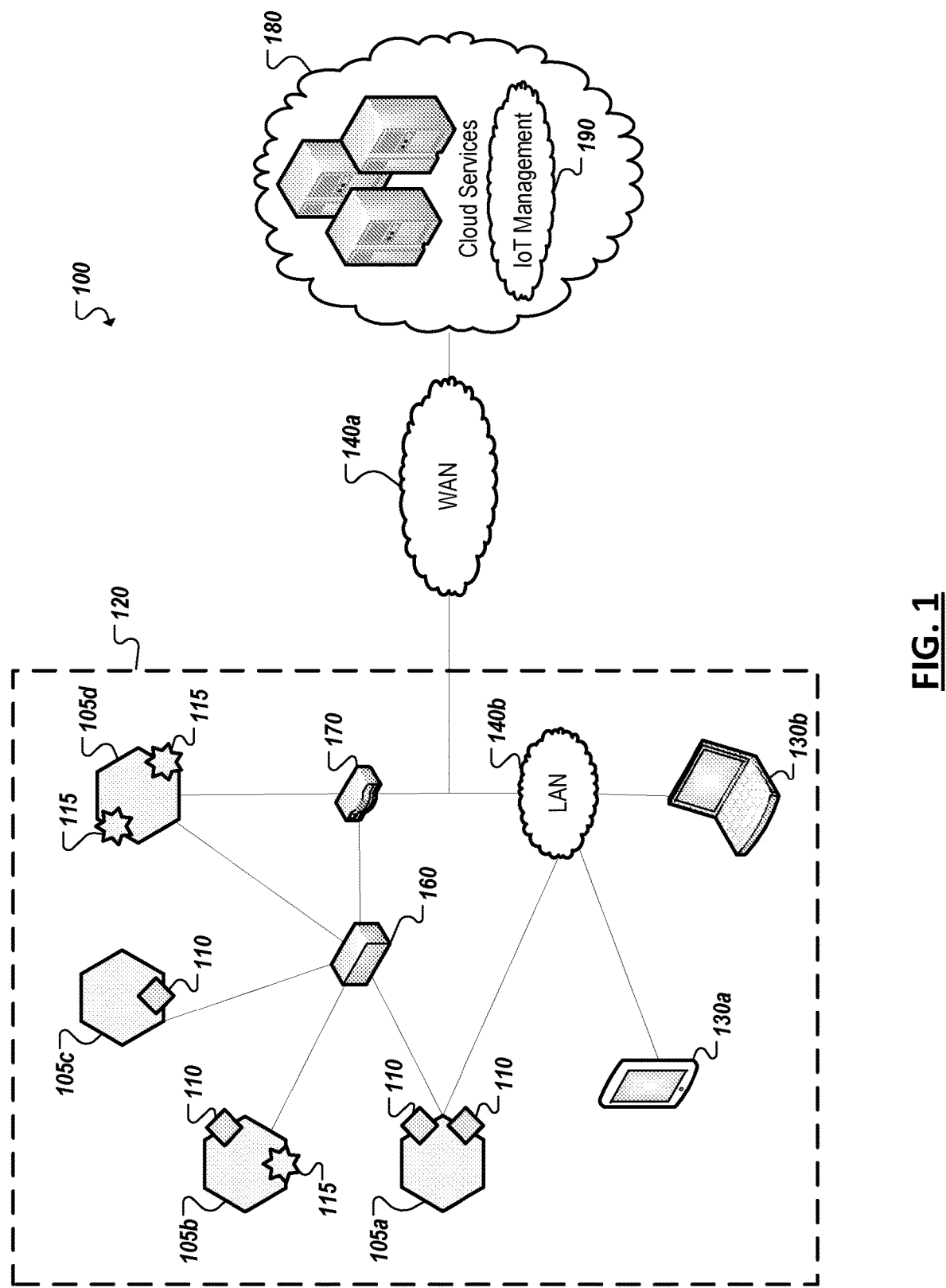
FIG. 1 illustrates an example embodiment of a communications system.

FIG. 1 illustrates an example embodiment of a communications system 100. Communications system 100 includes edge devices 120, networks 140, and cloud services 180. Edge devices 120 include a variety of devices deployed at the "edge" of the communications system 100, including sensor and/or actuator devices 105, end-user devices 130 (e.g., mobile devices, laptops), resource brokers 160, and gateways 170. Edge devices 120 may communicate with other remote networks and/or services (e.g., cloud services 180) through a back-haul network, such as Wide Area Network (WAN) 140a to connect to the Internet.

Sensor/actuator devices 105 of edge devices 120 may include one or more types of sensors (e.g., 110) and/or actuators (e.g., 115), along with other resources such as processors, storage, power, and/or communications functionality, which can be leveraged and utilized within a machine-to-machine (M2M) or Internet-of-Things (IoT) communications system 100. For example, sensor/actuator devices 105 may include a computer processor and/or communications interface to allow interoperation with other edge devices 120 (e.g., end-user devices 130, broker 160, and/or gateway 170) or network services (e.g., cloud services 180, IoT management service 190) if needed (e.g., if these devices are not in the proximity of a gateway 170).

Sensors 110 of each device 105 may include internal sensors and/or external sensors. Internal sensors 110, also known as "soft" sensors, may be configured to sense or monitor contextual information regarding a device's 105 own internal operating environment, such as processor usage, device workload, memory capacity, battery capacity, network usage, internal temperature (e.g., heating of processors), software security alerts, software errors and exceptions, among other attributes and events. External sensors 110, also known as hardware or physical sensors, may be configured to detect, measure, and generate sensor data describing characteristics and contextual information of the device's 105 external operating environment where it resides. For instance, a given sensor 110 may be configured to detect contextual information of a device 105, such as movement, weight, physical contact, temperature, wind, noise, light, computer communications, wireless signals, location, humidity, the presence of radiation, liquid, or specific chemical compounds, among several other examples. Indeed, device sensors 110 as described herein contemplate a potentially limitless universe of various sensors, each designed to detect and generate corresponding sensor data for new and unknown operating environment characteristics.

Actuators 115 of each device 105 are components configured to perform a particular action that impacts a device's environment. For instance, devices (e.g., 105b, d) may include actuators 115 that accept an input and perform a respective action in response. Actuators can include controllers to activate additional functionality, such as an actuator to selectively toggle the power or operation of an alarm, camera (or other sensors), heating-ventilation-air conditioning (HVAC) appliance, household appliance, in-vehicle device, and/or lighting, among other examples.

As noted above, sensors 110 and actuators 115 of devices 105 can be incorporated into an Internet-of-Things (IoT) and/or machine-to-machine (M2M) system. IoT or M2M systems (which may be used interchangeably herein) may refer to new or improved ad-hoc systems and networks composed of multiple different devices operating synergistically to deliver one or more results, services, or deliverables. Such ad-hoc systems are emerging as more and more products and equipment evolve to become "smart," meaning that they are controlled and/or monitored by computing processors and provided with facilities to communicate, through computer-implemented mechanisms, with other computing devices (and products having network communication capabilities). For instance, IoT systems may include networks built from sensors and communication modules integrated in, or attached to, "things" such as equipment, toys, tools, vehicles, etc., and even living things (e.g., plants, animals, humans). Sensor and/or actuator devices 105 may be "greenfield" devices developed with IoT capabilities from the ground-up, or "brownfield" devices created by integrating IoT capabilities into existing legacy devices that were initially developed without IoT capabilities. In some instances, an IoT system can develop organically or unexpectedly, with a collection of sensors monitoring a variety of contextual attributes of their operating environments, which are then interconnected with data analytics systems and/or systems controlling one or more other smart devices to enable various novel use-cases and applications. Further, IoT systems can be formed from devices that originally had no relationship or communication with each other, where the system is automatically configured spontaneously or on the fly (e.g., in accordance with an IoT application defining or controlling the interactions). Further, IoT systems can often be composed of complex and diverse collections of connected devices (e.g., edge devices 120), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet-of-Things is that innovators in many fields will dream up new applications involving diverse groupings of IoT devices as such devices become more commonplace, and as new "smart" or "connected" devices emerge.

As shown in the example of FIG. 1, an IoT system 100 can include a variety of IoT edge devices 120, including sensor/actuator devices 105, end-user devices 130, resource brokers 160, and/or gateways 170, among other examples. For instance, an IoT device 120 can include such examples as a mobile personal computing device (e.g., 130a), such as a smart phone or tablet device, a wearable computing device (e.g., a smart watch, smart garment, smart glasses, smart helmet, headset, etc.), less conventional computer-enhanced products such as home, building, and vehicle automation devices (e.g., smart heat-ventilation-air-conditioning (HVAC) controllers and sensors, light detection and controls, and energy management tools), smart appliances (e.g., smart televisions, smart refrigerators), among other examples. Some devices can be purposefully built to host sensor and/or actuator resources (i.e., "greenfield" devices), such as weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active humans or animals, and/or an aerial, ground-based, or underwater drone, among other examples. Indeed, it may be desired that some sensors move within an environment and applications can be built around use-cases involving mobile devices, mobile users, and/or changing environments.

Continuing with the example of FIG. 1, IoT management platforms 190 can be provided to allow developers and end users to build and configure IoT applications and systems. An IoT application can provide software support to organize and manage the operation of a set of IoT devices for a particular purpose or use-case. In some cases, an IoT application can be embodied as an application on an operating system of a user computing device (e.g., laptop 130b), a mobile application for execution on a smart phone, tablet, smart watch, or other mobile device (e.g., 130a), and/or an IoT application on another edge device (e.g., gateway 170). In some cases, an IoT management system 190 can provision one or more deployed devices in an IoT system with the appropriate IoT application(s).

In some cases, an IoT application can make use of a dedicated or general purpose management utility or administrative tool 190 allowing users to configure settings and policies to govern how the set of devices (e.g., IoT edge devices 120) are to operate when deployed in an IoT system. An IoT management utility 190 can also be used to select which IoT devices are to be used with a particular IoT application. In other cases, a dedicated IoT management application can be provided which can manage potentially multiple different IoT applications or systems. The IoT management utility 190, or system, may be hosted on a single system, such as a single server system (e.g., 180) or a single device (e.g., 105, 130, 160, 170), or alternatively the IoT management system may be distributed across multiple hosting devices at the edge (e.g., 180, 105, 130, 160, 170).

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 180, 190). For instance, the IoT system can connect to a remote service over one or more networks 140. In some cases, the remote service can, itself, be considered an asset of an IoT application and system. Data received by a remotely-hosted service can be consumed by the governing IoT application and/or one or more of the component IoT devices to cause one or more results or actions to be performed, among other examples.

One or more networks 140 may facilitate communication between IoT devices 120 and other remote networks or services, such as cloud services 180 and/or IoT management services 190, to implement and manage IoT applications and devices. Such networks can include wired and/or wireless local networks, public networks, wide area networks, broadband cellular networks, the Internet, and the like. In some implementations, one or more gateway devices 170 can be utilized to facilitate communications with, or between, IoT devices 120 (e.g., sensor/actuator devices 105 and end-user devices 130) within a given IoT system 100. For instance, a gateway 170 can be utilized to extend the geographical reach of an IoT system, to provide a mechanism to communicate with IoT devices that possess limited or proprietary communications capabilities (e.g., sensor/actuator devices 105), or form sub-groups of devices within an IoT system deployment. For example, in some cases, gateways 170 may extend the reach of IoT devices built with short-range communication capabilities (e.g., Bluetooth or ZigBee devices) by providing a front-haul to those devices using their native communications capabilities, and providing a back-haul to the cloud through Wi-Fi, Ethernet, cellular, and/or any other wired or wireless communication medium.

With the growth of IoT devices and systems, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

In addition, IoT systems are generating an unprecedented volume and variety of data. Existing IoT edge devices typically offload this data to the cloud for processing and/or storage. Existing cloud-based services, however, are not equipped for the rapidly growing volume, variety, and velocity of IoT data. Cloud-based services may not be ideal in certain circumstances, for example, when processing time-sensitive data or highly confidential data, or when faced with network bandwidth constraints, among other examples. For example, when time-sensitive data finally makes its way to the cloud for analysis, the opportunity to act on that data may have already passed.

"Edge" processing may be leveraged, in some embodiments, to complement the shortcomings of cloud-based processing (e.g., when cloud-based processing is inefficient, ineffective, and/or unsecure), better handle the ever-growing volume, variety, and velocity of IoT data, and save network and Internet resources. Edge processing is an approach that processes certain IoT data at the network edge, near where it was generated, rather than simply funneling large volumes of IoT data to the cloud for processing and storage. Processing IoT data near its source rather than in the cloud may, in some cases, improve performance and avoid system failures or disasters. Edge processing may also conserve network bandwidth, which may be particularly beneficially when facing bandwidth constraints and/or limited network connectivity. Certain data, however, still may be sent to the cloud for historical analysis and long-term storage. Edge processing may be referred to as "fog" computing, as it serves to extend the "cloud" to the edge of a network, creating a "fog" over the network edge. The fog may be considered to be a massively interconnected network wherein a number of IoT devices 120 are in communications with each other, for example, by radio links. This may be performed, in some embodiments, using the open interconnect consortium (OIC) standard specification 1.0 released by the Open Connectivity Foundation™ (OCF) on Dec. 23, 2015. This standard allows devices to discover each other and establish communications for interconnects. Another protocol that may be used in smart-home and similar deployments is Thread, a networking protocol for Internet-of-Things (IoT) "smart" home automation devices, developed by an alliance of organizations named the "Thread Group." Other interconnection protocols may also be used, including, for example, the optimized link state routing (OLSR) Protocol, or the better approach to mobile ad-hoc networking (B.A.T.M.A.N.), among others.

In some embodiments, edge devices 120 may be implemented with cognitive edge processing capabilities to facilitate intelligent network management decisions. Cognitive edge devices 120 may detect and leverage contextual information about their operating environment based on information from sensors 110, other edge devices 120 (e.g., end-user devices 130, brokers 160, gateways 170), cloud services 180, and/or other network resources. This context information for an edge device 120 may be leveraged for various purposes, including cognitive edge processing and service delivery, resource orchestration, and/or intelligent network configuration. Cognitive edge devices 120 may leverage context information, for example, to decide where data should be processed and/or stored (e.g., the cloud or the edge) and by which network entities (e.g., gateways 170, end-user devices 130, the cloud 190). These cognitive decisions could be based, for example, on contextual information about the data that needs to be processed (e.g., the type, volume, and/or age of the data), the desired response time, network resource availability and bandwidth constraints, the ability to meet service delivery requirements (e.g., from service level agreements (SLA) or other service delivery specifications), the availability and health of edge devices 120 (e.g., gateways 170, end-user devices 130), the availability and health of cloud services 190, and the physical location of edge devices 120, among other examples. Cognitive edge devices 120 may include any type of edge device, component, and/or node that is enhanced with cognitive and/or context-aware processing capabilities (e.g., local or edge-based data aggregation, processing, and storage capabilities), including gateways 170, brokers 160 (or other orchestration nodes), end-user computing devices 130, sensor/actuator devices 105, local servers, edge servers, and edge (or fog) IoT applications, among other examples. In some embodiments, a cognitive edge device 120 may be formed from multiple interconnected edge devices 120 that effectively operate as a single device. For example, if the contextual information for an edge device 120 indicates that its resources are insufficient, the edge device may be interconnected with one or more additional edge devices, such that the edge device 120 then comprises multiple interconnected edge devices.

Cognitive and/or context-aware edge processing capabilities may also be leveraged, in some embodiments, by resource orchestration brokers 160. For example, a resource broker 160 may provide resource orchestration and workload distribution services for edge devices 120 that are managed by the broker 160. Resource broker 160 may use context information from cognitive edge devices 120 to make intelligent workload distribution decisions that maximize performance and guarantee service delivery. Resource broker 160 may be implemented as a standalone edge device, as functionality in an existing edge device, and/or as functionality distributed across multiple edge devices and/or network components. In some embodiments, resource broker 160 may itself be a cognitive edge device 120.

Cognitive and/or context-aware edge processing capabilities may also be leveraged, in some embodiments, to provide intelligent IoT configuration and deployment, including, for example, autonomous gateway 170 configuration. Deployment, configuration, and management of IoT systems may be significantly improved, in some embodiments, through cognitive context-aware edge devices 120 that facilitate autonomous network configuration and management, which significantly reduces the human interaction and labor required in complex and evolving IoT systems. For instance, IoT management and applications can adopt a paradigm where, instead of being programmed and/or configured to operate with specific IoT devices 120 and/or cloud services 180 in static environments and/or use-cases, the system can leverage contextual information about the operating environment of the cognitive IoT devices 120 to autonomously configure and deploy (and re-deploy) an IoT system, and intelligently manage the IoT system, with minimal human intervention. For example, context-aware gateways 170 may configure themselves autonomously based on their use-case and context information about their operating environment, updating that configuration autonomously as their operating environment and/or use-case changes.

In some embodiments, an IoT management system 190 may be used to facilitate autonomous configuration and/or deployment of IoT devices and applications, such as IoT gateways 170. For example, an IoT management system 190 may utilize asset abstraction to simplify the IoT device configuration and deployment process. For instance, users can simply select use-cases, classes, and/or taxonomies of IoT devices 120 and logically assemble a collection of select device classes to build and/or deploy at least a portion of an IoT system or application (e.g., without having to provide details regarding configuration, device identification, data transfer, etc.). In fact, in some cases, the use-case for a particular IoT device or application may be determined automatically based on contextual information from the IoT devices 120, such as a context-aware IoT gateway 170.

In addition to facilitating autonomous and efficient IoT network management, context-aware IoT devices 120 may also improve the resiliency of IoT systems, which may often be expected to provide high levels of reliability and resiliency. Indeed, such characteristics can be critical in some implementations, where even an incremental failure of an IoT system results in costly damage or even potential loss of life. Providing such reliability and resiliency can be challenging in IoT systems, particularly given the dynamic and evolving nature of IoT systems, the number and diversity of devices in IoT systems, and the mobility and continuously changing environments of IoT devices. Particularly in large IoT systems (with more than dozens or hundreds of devices), managing the health and reliability of each device can be prohibitively complex for human managers. Sustained failure of a single device can potentially result in failure of the entire system. Managing a large number of potential points of failure can be daunting. Indeed, given the potential variety of devices (and device manufacturers), some devices can be expected to have higher levels of native resiliency and reliability than others. Further, as many devices may be battery powered, the trustworthiness of the various power sources can also be a factor in how individual devices, and the collective IoT system, perform.

In one implementation, a scalable system management framework for resilient Internet-of-Things (IoT) systems is provided that facilitates the ability of IoT devices 120 (e.g., gateways 170) to dynamically adapt to changes in the system (e.g., battery level change, microprocessor idle time, network topology, device workload change, etc.) and do so in a distributed and cost efficient manner. Further, the system management framework can promote system resiliency at both the system and device level by enabling automated self-healing and self-optimizing of the system. Self-healing can be enabled, for instance, by continuously collecting operating status of individual component devices and causing them to restart or reset when appropriate. Such self-healing actions can take place at the device level. Self-healing can involve the performance of tasks and processes at a device to return the device to its healthy operating state. Further, given that operating status is collected in the background, the framework can utilize machine learning techniques to derive meaning from the data and learn patterns within the system. Models can be developed based on this learning, which can be used to prescribe an action to restart or reconfigure components individually, or redeploy all or a portion of the system as a whole. Reconfiguring can refer to making operational changes to applications/services running on a given device within an IoT system. Redeployment can refer to moving applications/services from the device to other nearby, but compatible devices (e.g., replacing devices in the IoT system with other compatible devices, etc.), or alternatively to a device moving to a new operating environment.

Reliability of an IoT system can refer to the reliability of the system delivering a desired result or outcome in the face of intrinsic influencing factors. System resiliency can refer to the ability of a system to maintain acceptable levels of service despite run-time challenges such as hardware and software failures, communication outages, security threats, or other extrinsic issues. Resilience may contemplate the system maintaining a degraded, but acceptable level of service in some circumstances.

As the scale and dynamics of IoT systems become more difficult to manage, the resilience of IoT systems becomes increasingly important, particularly in implementations seeking to roll out economically viable IoT solutions at scale. Many conventional IoT solutions have proven vulnerable to real world conditions. For instance, the static nature and the unreliable operation of some current IoT technologies in dynamic and challenging operating environments has made some IoT deployments cost prohibitive (thereby discouraging, at some level, future attempts to adopt similar systems, in some cases).

In some embodiments, an improved management framework can be implemented by leveraging telemetry to remotely monitor physical context and conditions of each device (e.g., resource utilization, environmental sensor observations and instruments from the device's sensors and actuators) to ensure the maintenance of a proper working environment for the devices. Such monitoring can make possible self-healing and self-optimizing in some instances. Further, through resource abstraction, devices within a particular use-case, class, or taxonomy, can be treated indifferently in the application and system. Accordingly, in such implementations, IoT devices and applications can be configured, deployed, and redeployed automatically as they are written and stored to specify only resource requirements (by corresponding use-case or taxonomy) without requiring the specific identity information of each deployed device. Further, machine learning tasks utilized to enhance resiliency and reliability in the system can be distributed, such that at least a portion of the tasks are handled by the deployed devices using data local to the device. This can facilitate scaling up of systems utilizing the improved management framework.

As described above and explained further throughout the following figures, cognitive and/or context-aware devices 120 may provide numerous advantageous in IoT systems, including improved performance and service delivery, intelligent resource orchestration, and/or intelligent network configuration.

In general, systems, servers, clients, computing devices, network elements, hosts, end-user devices 130, sensor/actuator devices 105, and/or any other IoT edge devices 120 or network services (e.g., cloud services 180, IoT management services 190) in example IoT system 100 may include electronic computing devices operable to receive, transmit, process, store, or manage data and information associated with the IoT system 100. As used in this document, the term "computer," "processor," "processor device," or "processing device" is intended to encompass any suitable processing apparatus. For example, elements shown as single devices within the IoT system 100 may be implemented using a plurality of computing devices and processors, such as server pools with multiple server computers. Further, any, all, or some of the computing devices may be adapted to execute any operating system, including Linux, UNIX, Microsoft Windows, Apple MacOS, Apple iOS, Google Android, Windows Server, etc., as well as virtual machines adapted to virtualize execution of a particular operating system, including customized and proprietary operating systems.

Systems, such as those shown and illustrated herein, can include machine logic implemented in hardware and/or software, and/or embodied in a computer readable medium, to implement the solutions described throughout this disclosure.

While FIG. 1 is described as containing or being associated with a plurality of elements, not all elements illustrated within communications system 100 of FIG. 1 may be utilized in each alternative implementation of the present disclosure. Additionally, one or more of the elements described in connection with the examples of FIG. 1 may be located external to communications system 100, while in other instances, certain elements may be included within or as a portion of one or more of the other described elements, as well as other elements not depicted in the illustrated implementation. Further, certain elements illustrated in FIG. 1 may be combined with other components, as well as used for alternative or additional purposes in addition to those purposes described herein.

Figure 2:
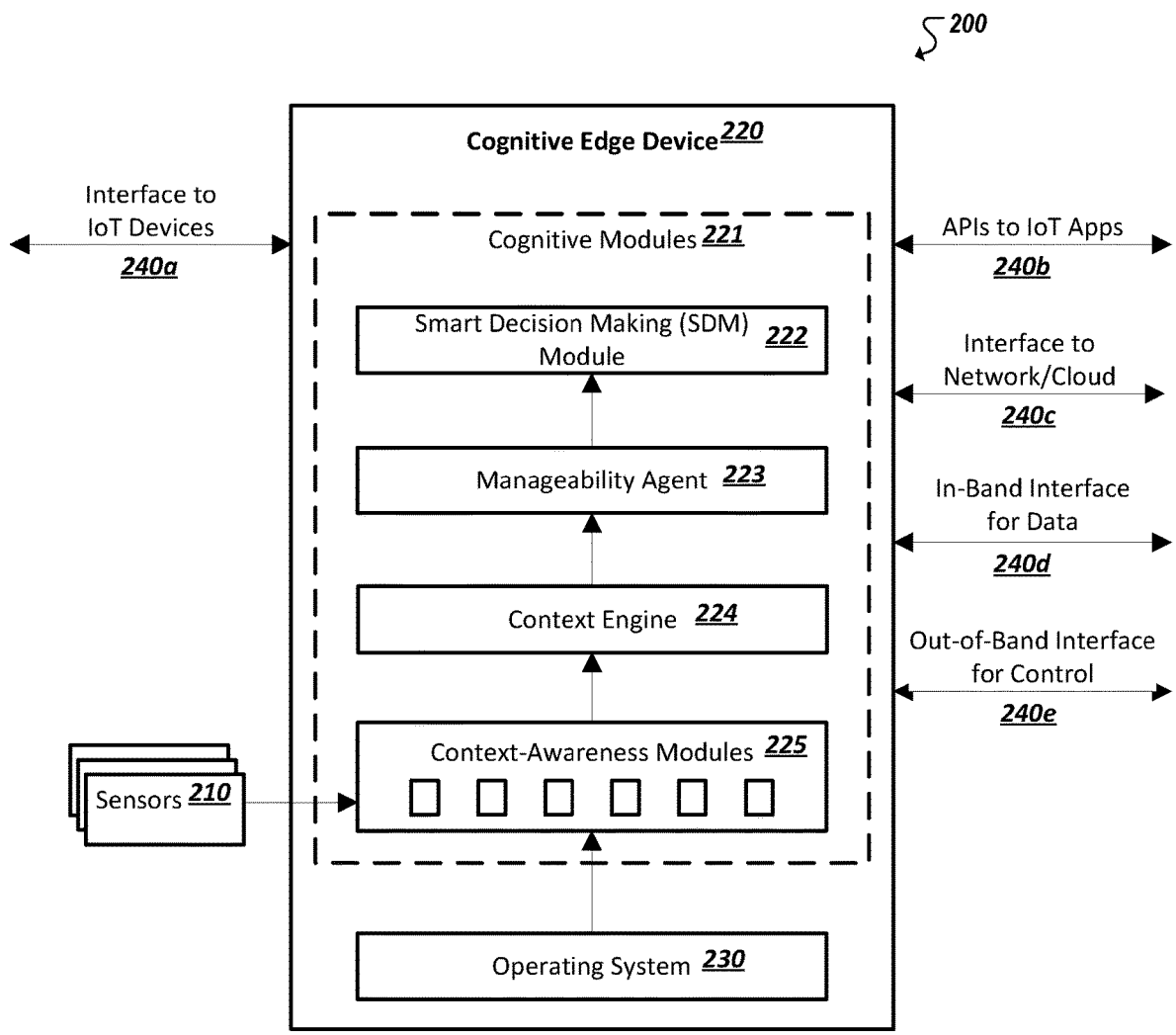
FIG. 2 illustrates a simplified block diagram of a cognitive edge device.

FIG. 2 illustrates a simplified block diagram 200 of a cognitive edge device 220. In some embodiments, cognitive edge device 220 may be similar to cognitive edge devices 120 of FIG. 1.

Existing (non-cognitive) edge devices have limited utilization, such as simple data aggregation roles and static operational approaches. For example, existing IoT gateway solutions are mainly used for aggregation of data coming from IoT sensors and devices without any cognitive processing or analysis of that data. These existing IoT gateways follow a static operational approach that lacks platform, network, and data awareness. IoT systems are driving the need for a wireless edge network infrastructure to process big data closer to their sources, to enable and guarantee real-time operations (e.g., for time-sensitive data), and to avoid the access network bottlenecks that may result from funneling large volumes of data to the cloud. For example, there is a need for cognitive features on IoT edge devices (e.g., IoT gateways) to enforce management policies among edge devices in an IoT system for data storage, processing, and transmission, workload distribution, and autonomous network configuration. The solution described throughout this disclosure enables cognitive features (e.g., platform awareness, network awareness, and data awareness) in IoT gateways and other edge devices, such as cognitive edge device 220, to allow context-aware decisions regarding data storage, processing, and transmission, workload distribution, and network configuration.

In the illustrated embodiment, cognitive edge device 220 includes operating system 230, sensors 210, cognitive modules 221, and interfaces 240*a-e*. Cognitive edge device 220 may be any type of edge device (i.e., deployed at the "edge" of a network), component, and/or node that is enhanced with cognitive and/or context-aware processing capabilities (e.g., local or edge-based data aggregation, processing, and storage capabilities), including gateways, brokers (or other orchestration nodes), end-user computing devices (e.g., mobile devices, laptops), sensor/actuator devices, local servers, edge servers, and edge (or fog) IoT applications, among other examples. Cognitive edge device 220 may be implemented, in some embodiments, as a physical device or a virtual machine running on a physical device. The cognitive features of cognitive edge device 220, for example, may be a set of functions implemented in a physical device (e.g., a gateway or other edge device), Microcontroller Unit (MCU), router with a virtual machine running a gateway, field-programmable gate array (FPGA) in a physical device (e.g., a gateway or router), and so forth.

Cognitive edge device 220 may be adapted to execute any operating system 230, including Linux, UNIX, Microsoft Windows, Apple MacOS, Apple iOS, Google Android, Windows Server, etc., as well as virtual machines adapted to virtualize execution of a particular operating system, including customized and proprietary operating systems.

Cognitive edge device 220 may be implemented with cognitive edge processing capabilities to facilitate intelligent network management decisions. For example, cognitive edge device 220 may detect and leverage contextual information about its operating environment based on information from sensors 210, from other edge devices 220 (e.g., end-user devices, brokers, gateways), from cloud services, and/or from other network resources. This context information may be leveraged for various purposes, including cognitive edge processing and service delivery, resource orchestration, and/or intelligent network configuration. Cognitive edge device 220 may leverage context information, for example, to decide where data should be processed and/or stored (e.g., the cloud or the edge) and by which network entities (e.g., gateways, end-user devices, or the cloud). These cognitive decisions could be based, for example, on contextual information about the data that needs to be processed (e.g., the type, volume, and/or age of the data), the desired response time, network resource availability and bandwidth constraints, the ability to meet service delivery requirements (e.g., from service level agreements (SLA) or other service delivery specifications), the availability and health of other edge devices (e.g., gateways, end-user devices), the availability and health of cloud services, and the physical location of edge devices, among other examples.

Cognitive edge device 220 may utilize context information from its own sensors and/or from sensors of other IoT devices. In some embodiments, sensors may be internal sensors or external sensors. Internal sensors, for example, may sense or monitor contextual information regarding a device's own internal operating environment, such as processor usage, device workload, memory capacity, battery capacity, network usage, internal temperature (e.g., heating of processors), software security alerts, and software errors and exceptions, among other attributes and events. External sensors, for example, may detect, measure, and generate sensor data describing characteristics and contextual information of the device's external operating environment where it resides. For instance, a given external sensor may be configured to detect contextual information of a device, such as movement, weight, physical contact, temperature, wind, noise, light, computer communications, wireless signals, location, humidity, the presence of radiation, liquid, or specific chemical compounds, among several other examples. Indeed, device sensors as described herein contemplate a potentially limitless universe of various sensors, each designed to detect and generate corresponding sensor data for new and unknown operating environment characteristics. The contextual information from the sensors may be leveraged by cognitive edge device 220 to facilitate intelligent network management decisions, as described throughout this disclosure. For example, a cognitive gateway device may utilize context information about the data that needs to be processed (e.g., the type, volume, and/or age of the data), network connectivity (e.g., Wi-Fi, cellular), network bandwidth, processing and memory availability, battery life, physical location, and so forth, to determine whether to process the data itself, send the data to other edge devices for processing, and/or send the data to the cloud for processing.

Cognitive edge device 220 may be leveraged, in some embodiments, to complement the shortcomings of cloud-based processing (e.g., when cloud-based processing is inefficient, ineffective, and/or unsecure), and better handle the ever-growing volume, variety, and velocity of IoT data. Cognitive edge device 220 may intelligently process certain IoT data at the network edge, near where it was generated, rather than simply funneling large volumes of IoT data to the cloud for processing and storage. Edge processing may be referred to as "fog" computing, as it serves to extend the "cloud" to the edge of a network, creating a "fog" over the network edge. Processing IoT data near its source rather than in the cloud may, in some cases, improve performance and avoid system failures or disasters. Cognitive edge processing may also conserve network bandwidth, which may be particularly beneficially when facing bandwidth constraints and/or limited network connectivity. In addition, cognitive edge processing allows maximum utilization of IoT device resources (e.g., communication, processing, and storage resources of an IoT gateway).

Cognitive processing capabilities of cognitive edge device 220 provide platform-awareness, network-awareness, and data-awareness. Platform-awareness, for example, may refer to a device's awareness of its own operating platform, including resource capabilities and availability (e.g., processing, storage, and communication capabilities, and the current utilization of those resources). Network-awareness, for example, may refer to a device's awareness of available communication networks, bandwidth constraints, network connectivity or availability, traffic patterns, connectivity range, and so forth. Data-awareness, for example, may refer to a device's awareness regarding data that needs to be processed, such as the type, volume, and/or age of the data, time-sensitivity for processing the data, storage policies for the data (e.g., long-term or short-term storage), and so forth.

These cognitive functions facilitate intelligent decision making by cognitive edge device 220. For example, cognitive processing capabilities may facilitate smart decision making regarding data processing, storage, and transmission and workload distribution for data coming from sensors and IoT devices, and autonomous network configuration. In addition, improved edge analytics may provide insights on optimal handling of data, for example, based on learning or awareness of the network description, the data description, and the description of the resources/capabilities of IoT gateways and other edge devices. Cognitive processing capabilities may also extend the notion of big data on gateways and other edge devices to consider metadata regarding the network description, the data description, and/or the description of resources/capabilities of the edge device and its neighboring edge devices. Cognitive processing capabilities may also allow workload distribution management and resource orchestration to intelligently distribute the workload among cognitive edge devices 220 for incoming data from sensors and other IoT devices (e.g., through a resource orchestration brokerage, such as those described throughout this disclosure in connection with other FIGURES). Cognitive processing capabilities may also facilitate autonomous network setup between gateways and other edge devices.

Existing edge devices and gateways communicate with the cloud using only northbound communication (i.e., simple uploads), without southbound control/actuation or traceability/reciprocity between the data and the action. This static processing and communication model does not suit the dynamic services needs of IoT systems. The cognitive processing capabilities of cognitive edge node 220, however, may facilitate trace and track capability, allowing the position of each edge device 220 to be identified within the service delivery chain (both upstream and downstream), along with its resource availability/utilization. This enables multi-hop service delivery and peer-to-peer communication between cognitive edge devices 220 in certain circumstances (i.e., communication between devices without going through the back-haul network). Trace and track capability may provide insight into the network resources involved in delivering a particular service (upstream and downstream), which may allow the source of service disruptions to be identified and isolated and the network to be adapted to eliminate or minimize the service disruption. For example, trace and track capability could allow an IoT system to identify a bottleneck impacting the performance of a video conferencing session, and adapt the network accordingly to alleviate the disruption (e.g., by utilizing less congested nodes in the service delivery chain, or eliminating the cause of the congestion altogether). Trace and track capability may improve the ability to comply with service delivery requirements (e.g., from service level agreements (SLA) or other service delivery specifications).

In the illustrated embodiment, cognitive processing capabilities of cognitive edge device 220 are implemented by cognitive modules 221. Cognitive modules 221 may be implemented, in some embodiments, as software modules in cognitive edge device 220. Cognitive modules 221 include smart decision making (SDM) module 222, manageability agent 223, context engine 224, and context-awareness modules 225.

Context-awareness modules 225 are context sensors that provide context information about the operating environment of cognitive edge device 220, as described throughout this disclosure. Context-awareness modules 225 may be provided using physical sensors 210 (e.g., GPS chipsets providing location information, network interface cards showing network interface types, battery showing residual battery life, and so forth) or soft sensors 210 (e.g., metadata in data packets showing service types, bandwidth estimation methods showing the available bandwidth, and so forth).

Context engine 224 collects context information in real-time from the context-awareness modules, aggregates the context information, and makes inferences about the operating environment of cognitive edge device 220 based on the context information, as described throughout this disclosure.

Manageability agent 223 enforces the policies for data processing, distribution, and transmission based on the realtime context information and any service delivery requirements (e.g., from service level agreements (SLA) or other service delivery specifications). This module also communicates the edge device's 220 context information in real-time to neighbor edge devices or gateways, and receives similar context information from the neighboring edge devices.

Smart decision making (SDM) module 222 enables intelligent network management and workload distribution decisions, as described throughout this disclosure. For example, this module may facilitate decisions regarding whether to process data locally or remotely in another edge device or gateway, whether to store the data locally or remotely (e.g., based on the data's storage policy and/or the device's local storage capacity), which network interface to use for transmission of the data, and so forth.

Cognitive edge device 220 also includes multiple interfaces 240a-e. Out-of-band interface 240e may be used, for example, for reliable communication with other gateways or edge devices for management and orchestration purposes, as described throughout this disclosure (e.g., sharing information on resource capabilities and/or availability, exchanging control signals, and so forth). In-band interface 240d may be used, for example, for data transmission between IoT gateways and other edge devices for workload distribution. For example, in some circumstances, IB interface 240d may utilize short-range communication protocols, such as Wi-Fi, Bluetooth, ZigBee, and so forth. Network interface 240c may be used, for example, for data transmission to the cloud. Networking interface 240c may, in certain circumstances, utilize long range communications, such as Ethernet, cellular, Wi-Fi, and so forth. In some embodiments, network interface 240c and in-band interface 240d may be the same interface operating in dual modes (e.g., short range communication for communication with neighbor edge devices and gateways and long range communication for communication with the cloud). IoT device interface 240a may be used, for example, for communication with other IoT devices, and IoT API interface 240b may be used, for example, as an interface between the edge device or gateway 220 and an IoT application.

Figure 3:
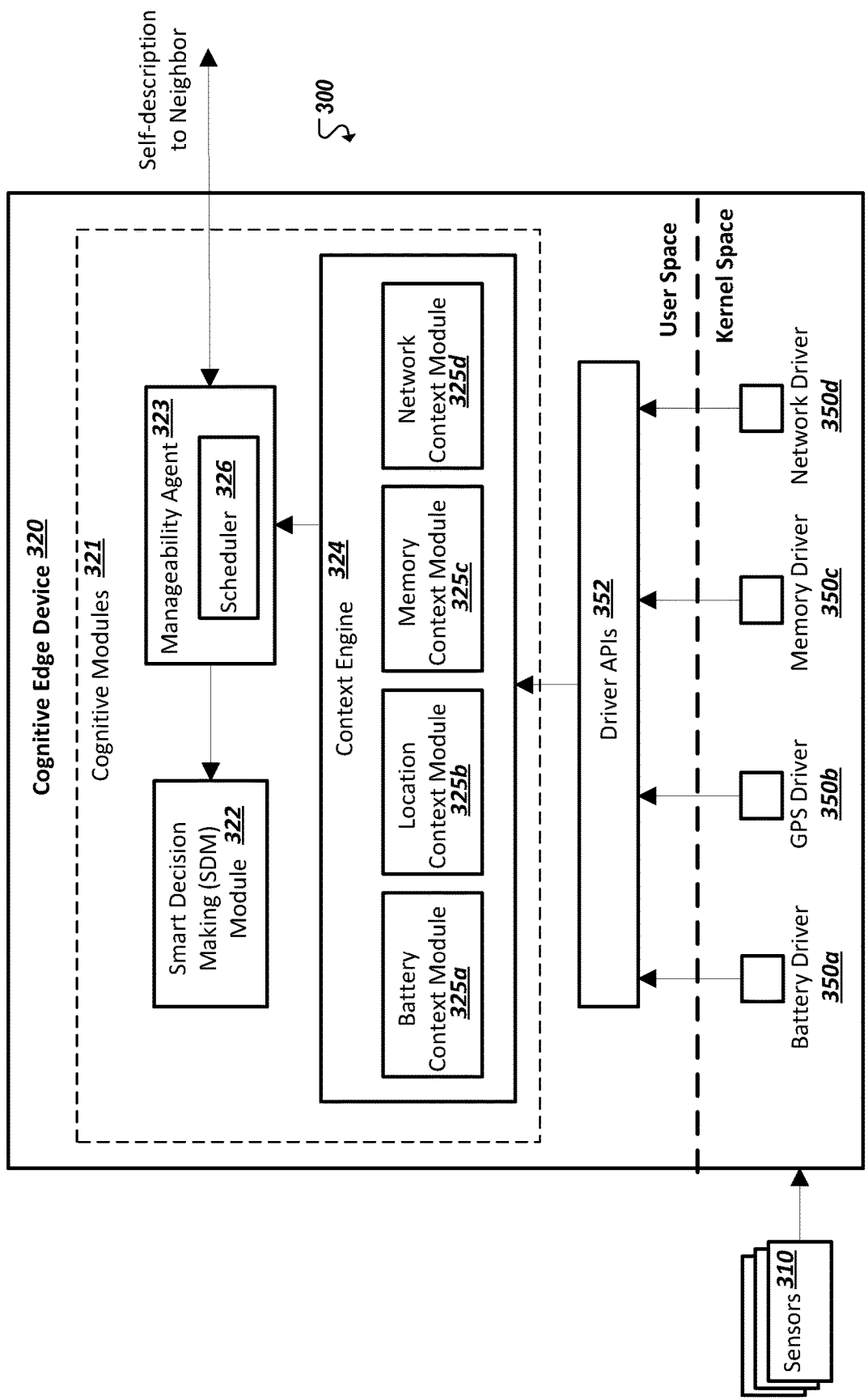
FIG. 3 illustrates an example embodiment of a cognitive edge device.

FIG. 3 illustrates an example embodiment 300 of a cognitive edge device 320. In some embodiments, cognitive edge device 320 may be similar to cognitive edge device 220 of FIG. 2.

In the illustrated embodiment, the user space of cognitive edge device 320 includes cognitive modules 321 and driver APIs 352. The kernel space of cognitive edge device 320 includes memory drivers 350a-d, which may interface with sensors 310 and/or other internal and/or external components of cognitive edge device 320, such as GPS chipsets, batteries, memory modules, and network interface cards.

The operating system, which corresponds to the "kernel space" in the illustrated embodiment, may utilize driver APIs 350a-d to provide information on the battery level, location, memory status, and available network interfaces of cognitive edge device 320. Driver APIs 352 may serve as a user land interface to the associated drivers 350 in kernel space. Drivers 350 may serve as an interface between the operating system kernel and each driver's associated hardware components and/or sensors 310, such as the device battery, GPS chipset, memory module, and network interface card.

The context-engine 324 is in user space and it continuously extracts the above context information via the driver APIs 352. The context-engine includes context modules 325 to process battery context information 325a, location context information 325b, memory context information 325c, and network interface context information 325d. Context-engine 324 may use the context information as described throughout this disclosure, for example, to perform intelligent network management decisions, such as decisions regarding data storage, processing, and transmission, and workload distribution, and so forth.

The manageability agent 323 is implemented on top of the context-engine 324 and uses the provided context information in real time for: (i) sharing context information with neighbor gateways or other edge devices, and (ii) setting rules for workload distribution through a scheduler sub-module 326 (or in some embodiments, a resource orchestration brokerage), whether locally in the same edge device or externally among other gateways or edge devices in the cloud.

The smart decision making (SDM) module 322 is triggered by the manageability agent 323 to set the policies on storage, processing, and transmission of data (e.g., using low-throughput network interfaces for non-real time data, using hardware acceleration for heavy analytics, storing data in memory, in a solid-state drive, or in the cloud), as described throughout this disclosure.

Figure 4:
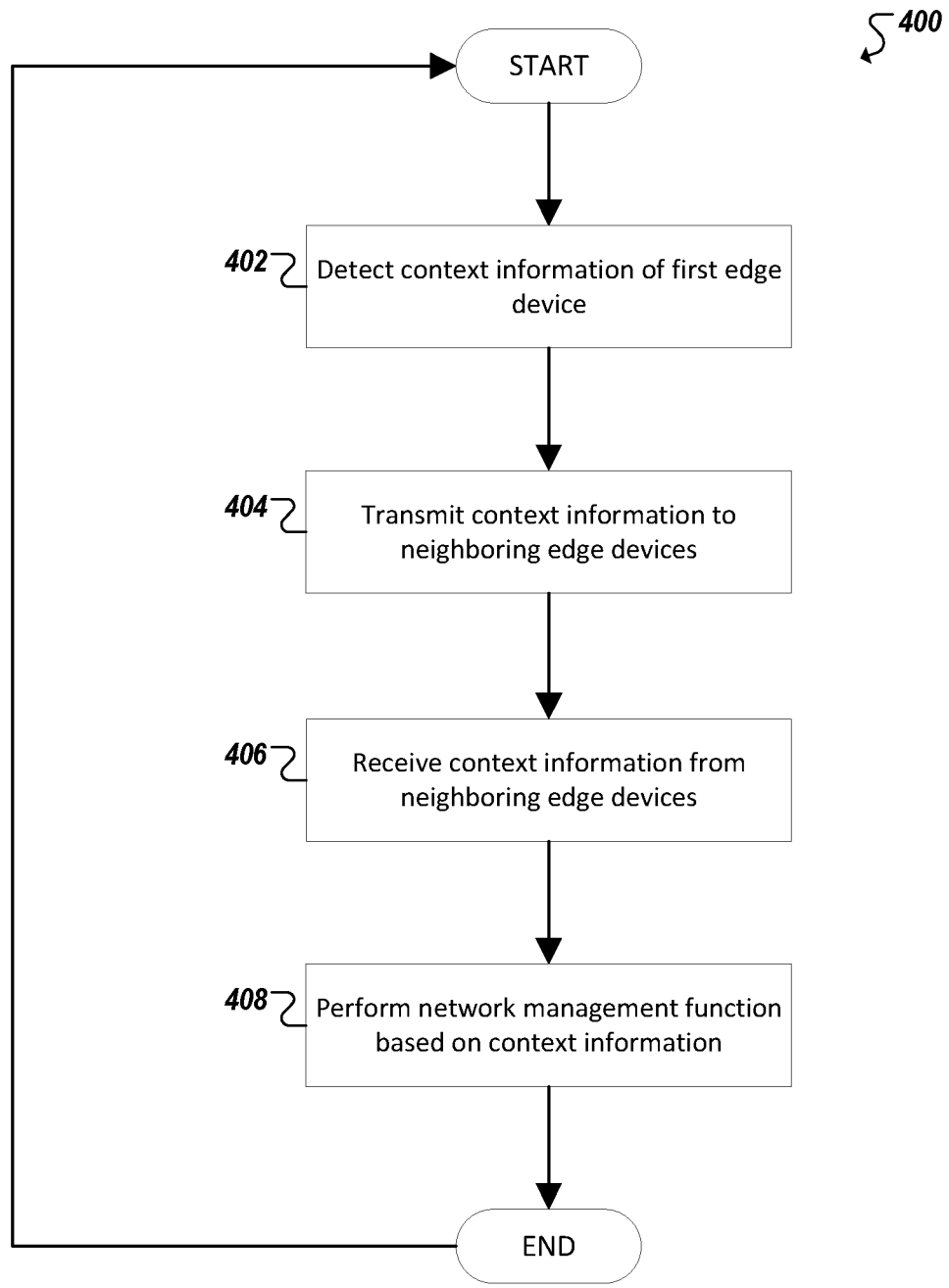
FIG. 4 illustrates a flowchart for an example embodiment of cognitive edge processing.

FIG. 4 illustrates a flowchart 400 for an example embodiment of cognitive edge processing. Flowchart 400 may be implemented, for example, by cognitive edge devices, such as those described throughout this disclosure (e.g., 120 of FIG. 1, 220 of FIG. 2, and 320 of FIG. 3).

Flowchart 400 may start at block 402, where context information of a first edge device is detected. The first edge device may be, for example, a cognitive edge device such as a cognitive gateway, as described throughout this disclosure. In addition, the first edge device may be configured to connect to the communications network at an edge of the communications network. The context information may identify an operating environment of the first edge device based on information from one or more sensors, as described throughout this disclosure.

The flowchart may then proceed to block 404, where the first edge device transmits its context information to neighboring edge devices. The neighboring edge devices may also be cognitive edge devices, for example, such as cognitive gateways.

The flowchart may then proceed to block 406, where the first edge device receives context information from its neighboring edge devices. The context information from the neighboring edge devices may identify the operating environment of the neighboring edge devices based on information from one or more sensors. Finally, the flowchart may then proceed to block 408, where the first edge device performs a network management function based on the context information of the first edge device and neighboring edge devices. The network management function may be, for example, a data processing, storage, and/or transmission function, a resource orchestration and/or workload distribution function, and/or an autonomous network configuration function, as described throughout this disclosure.

At this point, flowchart 400 may be complete, although in particular embodiments, the flowchart may restart at block 402 to continue detecting updated context information and performing network management functions.

Figure 5:
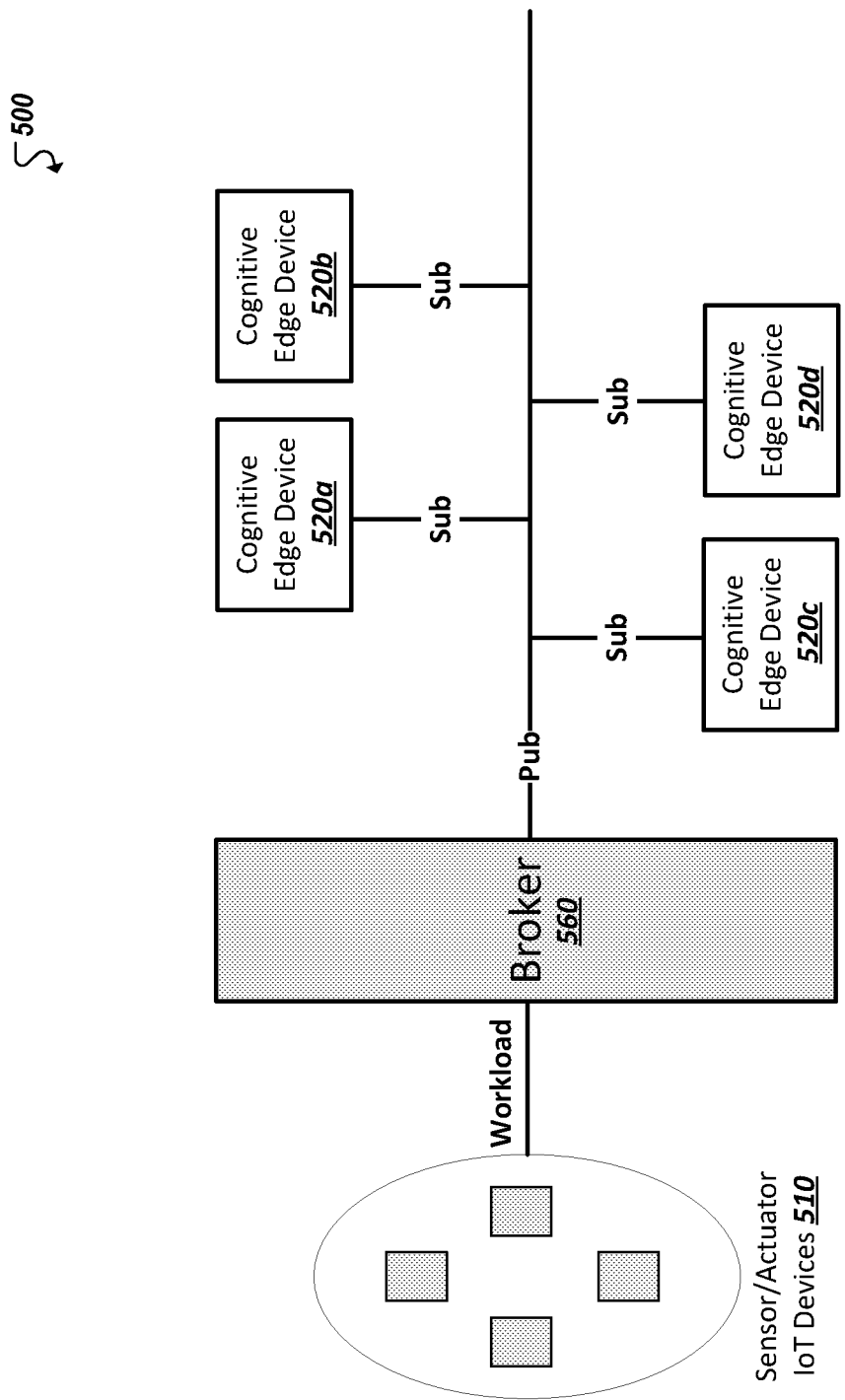
FIG. 5 illustrates an example embodiment of a centralized resource orchestration brokerage.
Figure 6:
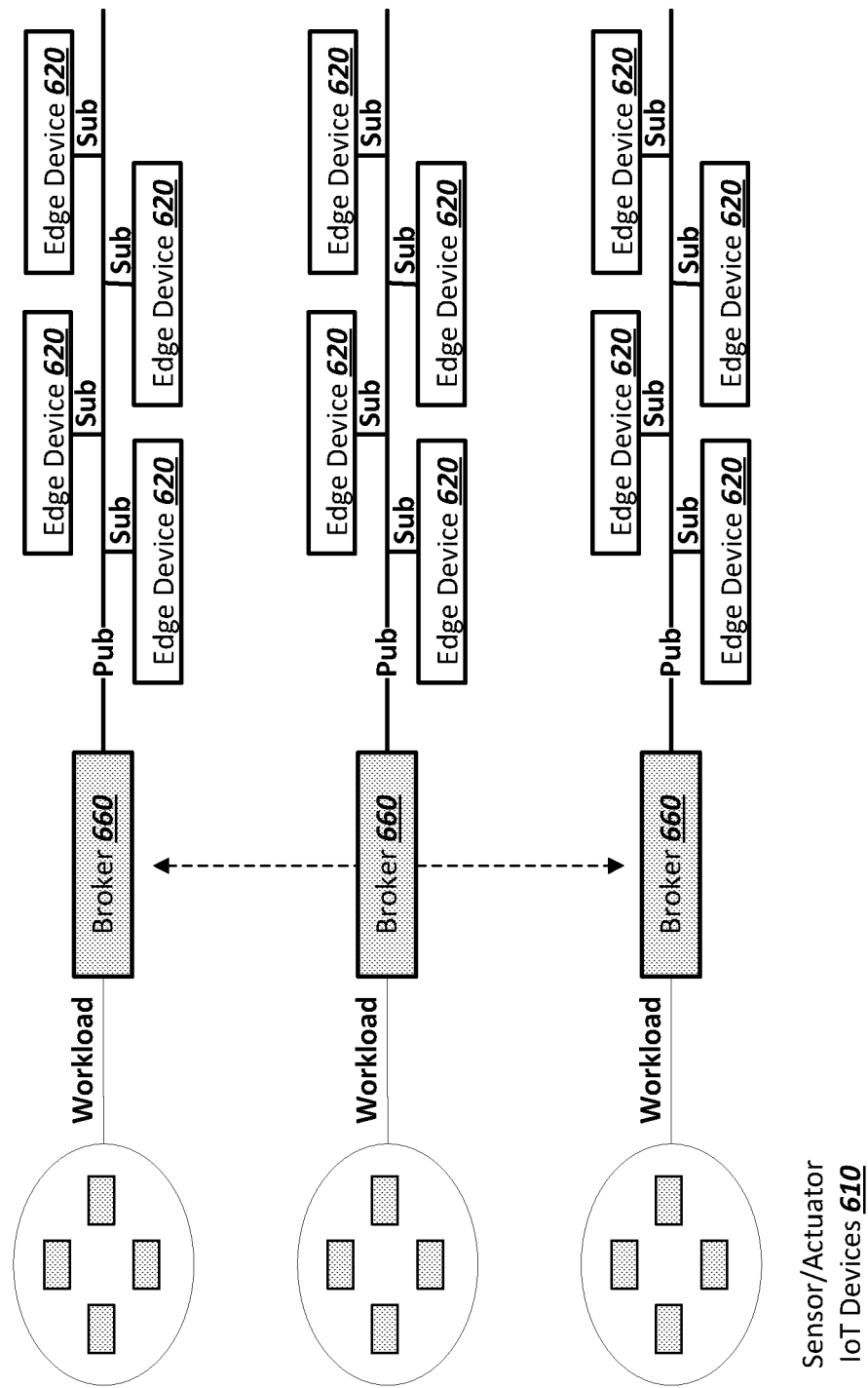
FIG. 6 illustrates an example embodiment of a distributed resource orchestration brokerage.
Figure 7:
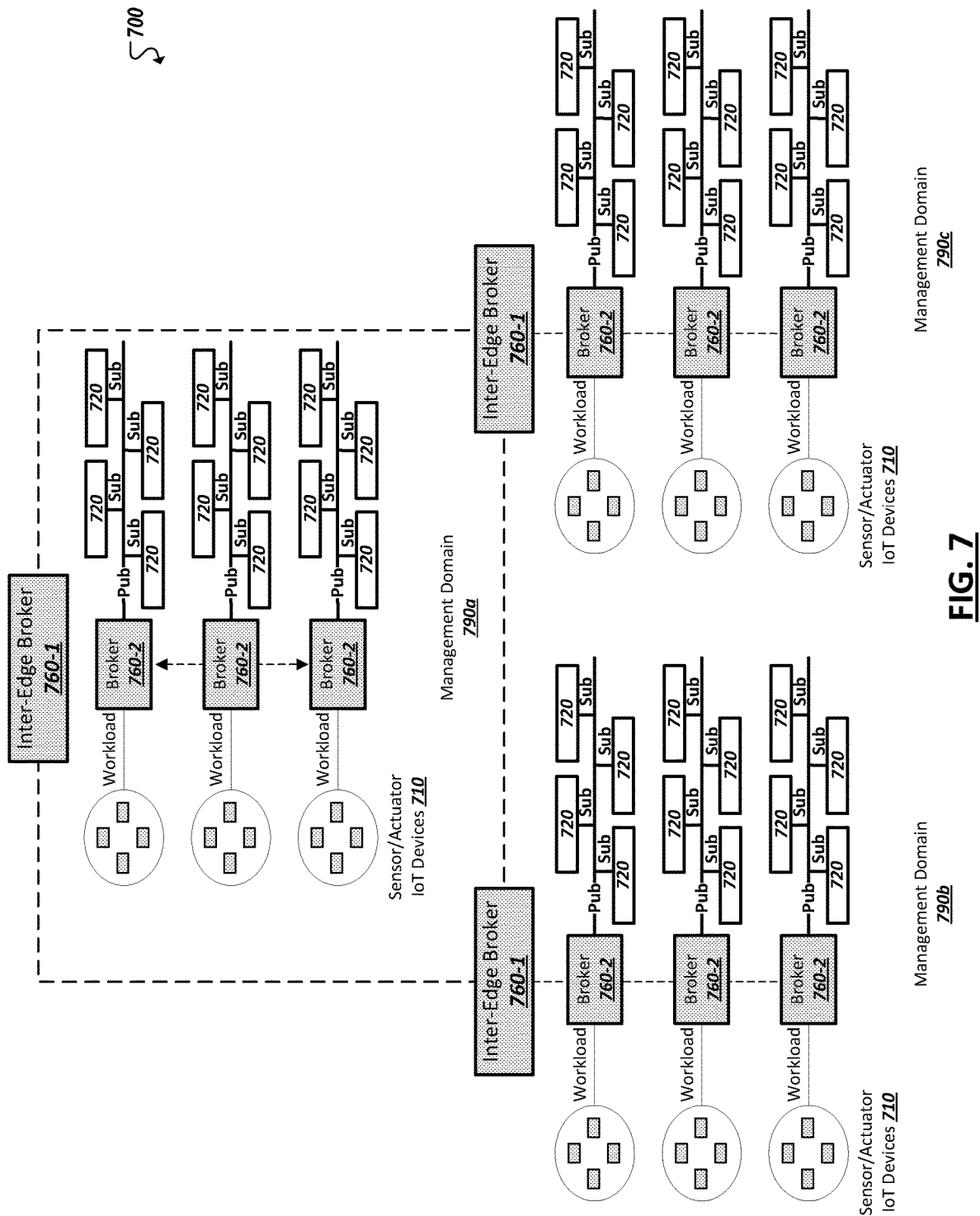
FIG. 7 illustrates an example embodiment of a federated resource orchestration brokerage.

FIGS. 5-7 illustrate example embodiments of resource orchestration brokers in different brokerage configurations.

Resource orchestration brokers may provide resource orchestration and workload distribution services for IoT sensor/actuator devices by distributing the workload among gateways and other edge devices that are managed by the broker. For example, IoT sensor/actuator devices may generate IoT data from one or more sensors, and the resource brokers may distribute the data processing workload for the generated IoT data among other edge devices that are managed by the broker, such as an edge gateway. In some cases, IoT devices may themselves be edge devices that are managed by the broker, such that the IoT devices are both providing IoT data for workload distribution by the broker and receiving workload distribution assignments from the broker. In some embodiments, the broker may be used with cognitive edge devices, such as those described throughout this disclosure (e.g., cognitive edge devices 120 of FIG. 1, 220 of FIG. 2, and 320 of FIG. 3). For example, when used with cognitive edge devices (such as cognitive gateways), resource brokers may use context information from the cognitive edge devices to make intelligent workload distribution decisions that maximize performance and service delivery. In some embodiments, a resource broker may itself be a cognitive edge device.

In some embodiments, resource brokers may be implemented as a standalone edge device, as functionality in an existing edge device, and/or as functionality distributed across multiple edge devices and/or network components. For example, in some embodiments, a broker may be implemented as a software component in another physical edge device (e.g., a controller embedded within an edge device "greenfield" or attached to an edge device "brownfield"), as part of the operating system of an edge device (e.g., serving green and brown field devices), or through a virtual machine on an edge device. For example, brokerage features may be a set of functions implemented in a physical device (e.g., a gateway or other edge device), Microcontroller Unit (MCU), router with a virtual machine running a gateway, field-programmable gate array (FPGA) in a physical device (e.g., a gateway or router), and so forth.

In general, a "broker" is an arbitrator that, in addition to simply facilitating a particular task or process, also gets involved with the task or process to facilitate the proper end result and/or goals. Accordingly, the broker is considered to be both enacting and interacting throughout that process.

Brokers may be introduced in IoT systems to automate the process of resource orchestration and dynamic workload distribution at the network edge. Brokers provide: (i) distributed manageability for IoT gateways and other edge devices, which extends the cloud resources to enable edge or fog computing; (ii) workload distribution among IoT gateways and other edge devices for data coming from sensors and IoT devices; and (iii) access to all the service level specifications for the resources involved in the service delivery chain, thereby improving the ability to comply with service delivery requirements (e.g., from service level agreements (SLA) or other service delivery specifications).

In some embodiments, an IoT edge network may reside before the access network (e.g., before the Wi-Fi access points or cellular base stations), acting as a backhaul for IoT sensors/actuator devices and a front-haul network for the access network. Resource orchestration brokers may be deployed in an IoT system as the last mile nodes for the IoT edge network (i.e., the first mile nodes for the IoT sensors/devices in the IoT edge network).

Resource orchestration brokers can be deployed in a variety of configurations, including centralized broker systems, distributed broker systems, inter-edge broker systems, and federated broker systems. For example, FIG. 5 illustrates an example of a centralized broker system 500, FIG. 6 illustrates an example of a distributed broker system 600, and FIG. 7 illustrates an example of a federated broker system 700 (which includes inter-edge brokers).

A centralized broker system, such as broker system 500 of FIG. 5, is one in which all gateways and other edge devices in a subnet connect to a centralized broker 560 for resource orchestration and workload distribution. The centralized broker 560 provides permanent service to the cloud, Internet, or other back-haul network, and relays all control and management signals from the cloud to the edge devices 520 that it manages. Depending on the embodiment, IoT sensor/actuator devices 510 may transmit their IoT data to the broker 560 periodically (i.e., push mode) or upon request by the broker (i.e., push mode). The broker 560 plays the role of arbitrator and distributes the workload, based on resource availability and other context information, among cognitive edge devices 520, such as gateways, that exist in the same management domain. This may be referred to as an inter-cluster distribution since there is only a single cluster of devices managed by broker 560.

Each cognitive gateway and cognitive edge device 520 publishes context information regarding its platform and resources to the broker 560 through an out-of-band channel. The broker 560 tracks information regarding the resources of cognitive gateways and other cognitive edge devices 520 based on context information provided regularly to the broker 560 by those cognitive devices 520. The broker 560 also receives data processing workloads from IoT sensor/actuator devices 510 and then distributes workload assignments among the cognitive gateways and edge devices 520.

A distributed broker system, such as broker system 600 of FIG. 6, is one in which several distributed brokers 660 exist in the same management domain, which may include a single subnet or multiple subnets, and each broker 660 is responsible for managing a number of IoT gateways and edge devices 620 for resource orchestration and workload distribution. Each broker 660 provides permanent service to the cloud, Internet, or other back-haul network, and relays all control and management signals from the cloud to the edge devices 620 that it manages. Each distributed broker 660 also guarantees a connection with other distributed brokers 660 for workload distribution in other subnets, which allows the management domain size to be increased.

The cognitive gateways and edge devices 620 form distributed clusters with a distributed broker 660 managing each cluster. Each cognitive gateway and cognitive edge device 620 publishes context information regarding its platform and resources to its cluster's distributed broker 660 through an out-of-band channel. That cluster's broker 660 tracks information regarding the resources of its cognitive gateways and edge devices 620 based on context information provided regularly to the broker 660 by those cognitive devices 620. The distributed broker 660 for each cluster also receives data processing workloads from IoT sensor/actuator devices 610 and then distributes workload assignments among all the cognitive gateways and edge devices 620 (managed by the various distributed brokers 660) within the same management domain based on their resource availability. This is considered an intra-cluster workload distribution between clusters. These clusters must be within the same management domain and have service proximity to each other so that the resources can be either assigned or harvested to match the service level agreement. Each cluster's broker 660 can offload workloads to other clusters' brokers 660 if the offloading broker 660 lacks the requisite resources in its own cluster and another cluster's broker 660 has resources available. This offloading between clusters may be performed through direct communication between the offloading cluster's broker 660 and other clusters' brokers 660, for example, by querying for resource availability of each cluster. Based on each cluster's resource availability, the offloading cluster's broker 660 distributes the workload to a neighbor cluster's broker 660, and the resource distribution process then follows the inter-cluster workload distribution approach described above.

An inter-edge broker system is one in which distributed brokers exist as inter-edge brokers (e.g., inter-edge brokers 760-1 of FIG. 7) that do not communicate with the back-haul network (e.g., the cloud, Internet) and instead only reside in the network edge or fog, with one of the inter-edge brokers chosen as the elected leader to coordinate the resource brokerage functions among the other brokers.

A federated broker system, such as broker system 700 of FIG. 7, is one in which the brokers 760 are distributed across multiple management domains 790a-c, providing resource orchestration and workload distribution services across multiple primary owners. Federated broker system 700 extends a distributed broker system across different management domains 790a-c using inter-edge brokers 760-1 to coordinate between the different management domains 790a-c. For example, in a federated broker system 700, inter-edge brokers 760-1 connect via an out-of-band interface to their own clusters' brokers 760-2 and to the inter-edge brokers 760-1 managing other clusters, to continuously get information on all clusters' resources. Each cluster's broker 760-2 that does not find resources in its own management domain 790 (whether in its own cluster or in other clusters in its management domain) looks to offload workload to other management domains 790, and queries its inter-edge broker 760-1 for resource availability. The inter-edge broker 760-1 sends the workload offload request to other inter-edge brokers 760-1, which distribute workloads on their own clusters through communication with their clusters' brokers 760-2, and the resource distribution process then follows the inter-cluster workload distribution process described above.

Figure 8:
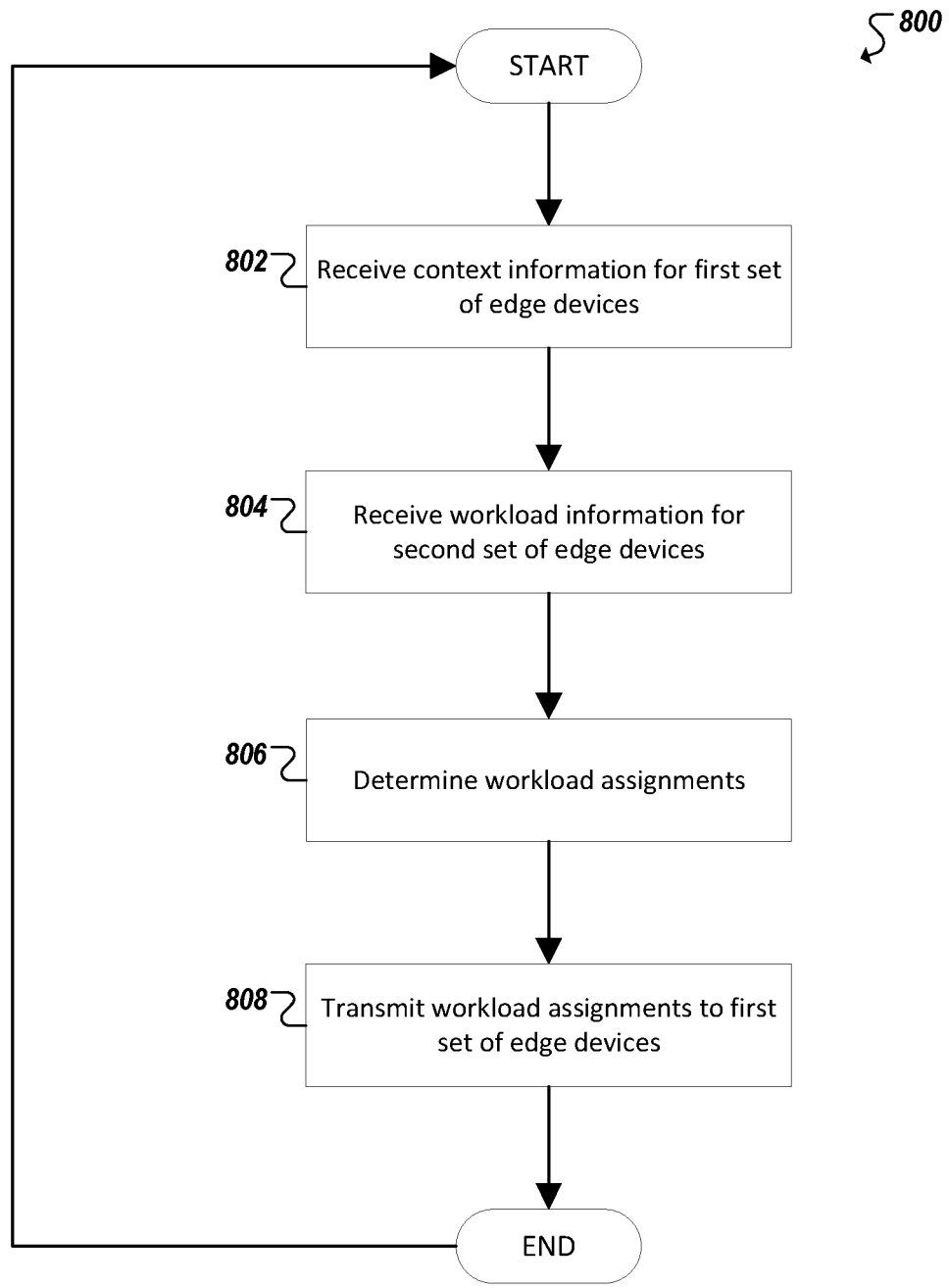
FIG. 8 illustrates a flowchart for an example embodiment of a resource orchestration brokerage.

FIG. 8 illustrates a flowchart 800 for an example embodiment of a resource orchestration brokerage. Flowchart 800 may be implemented, for example, by a resource orchestration broker, such as those described throughout this disclosure (e.g., 160 of FIG. 1, 560 of FIG. 5, 660 of FIG. 6, 760 of FIG. 7).

Flowchart 800 may start at block 802, where a resource orchestration broker receives context information for a first set of edge devices. The first set of edge devices may be, for example, cognitive edge devices such as cognitive gateways, as described throughout this disclosure. In addition, the first set of edge devices may be configured to connect to the communications network at an edge of the communications network. The context information may identify an operating environment of the first set of edge devices based on information from one or more sensors, as described throughout this disclosure.

The flowchart may then proceed to block 804, where the resource orchestration broker receives workload information for a second set of edge devices. The second set of edge devices may be, for example, IoT sensor devices that use sensors to generate data that may require further processing, as described throughout this disclosure. The workload information may be, for example, information about the volume, type, and/or age of data generated by the IoT sensor devices that needs to be processed further. In some embodiments, the second set of edge devices may also be cognitive edge devices.

The flowchart may then proceed to block 806, where the resource orchestration broker determines workload assignments for the first set of edge devices based on the context information for the first set of edge devices and based on the workload information for the second set of edge devices. For example, the resource orchestration broker may determine workload assignments for the first set of edge devices based on their resource availability and other contextual information about their operating environment, and the size of the workloads that need to processed.

The flowchart may then proceed to block 808, where the resource orchestration broker transmits the workload assignments to the first set of edge devices.

At this point, flowchart 800 may be complete, although in particular embodiments, the flowchart may restart at block 802 to continue receiving context information and workload information, determining workload assignments, and transmitting workload assignments.

Figure 9:
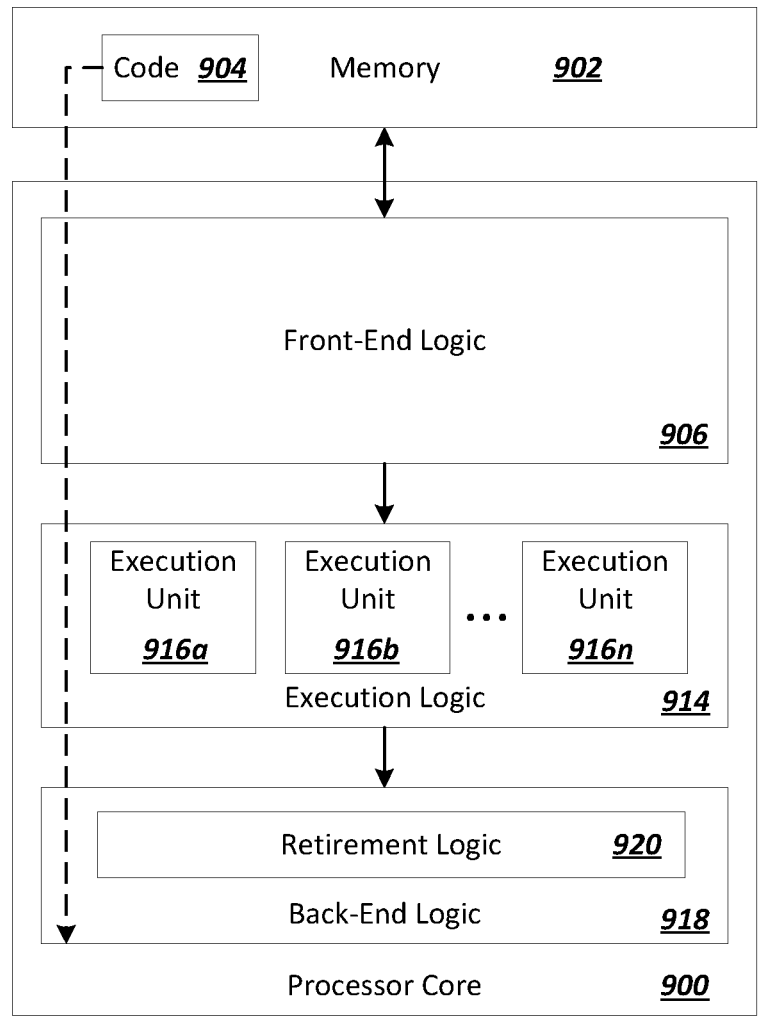
FIG. 9 illustrates a block diagram for an example embodiment of a processor.
Figure 10:
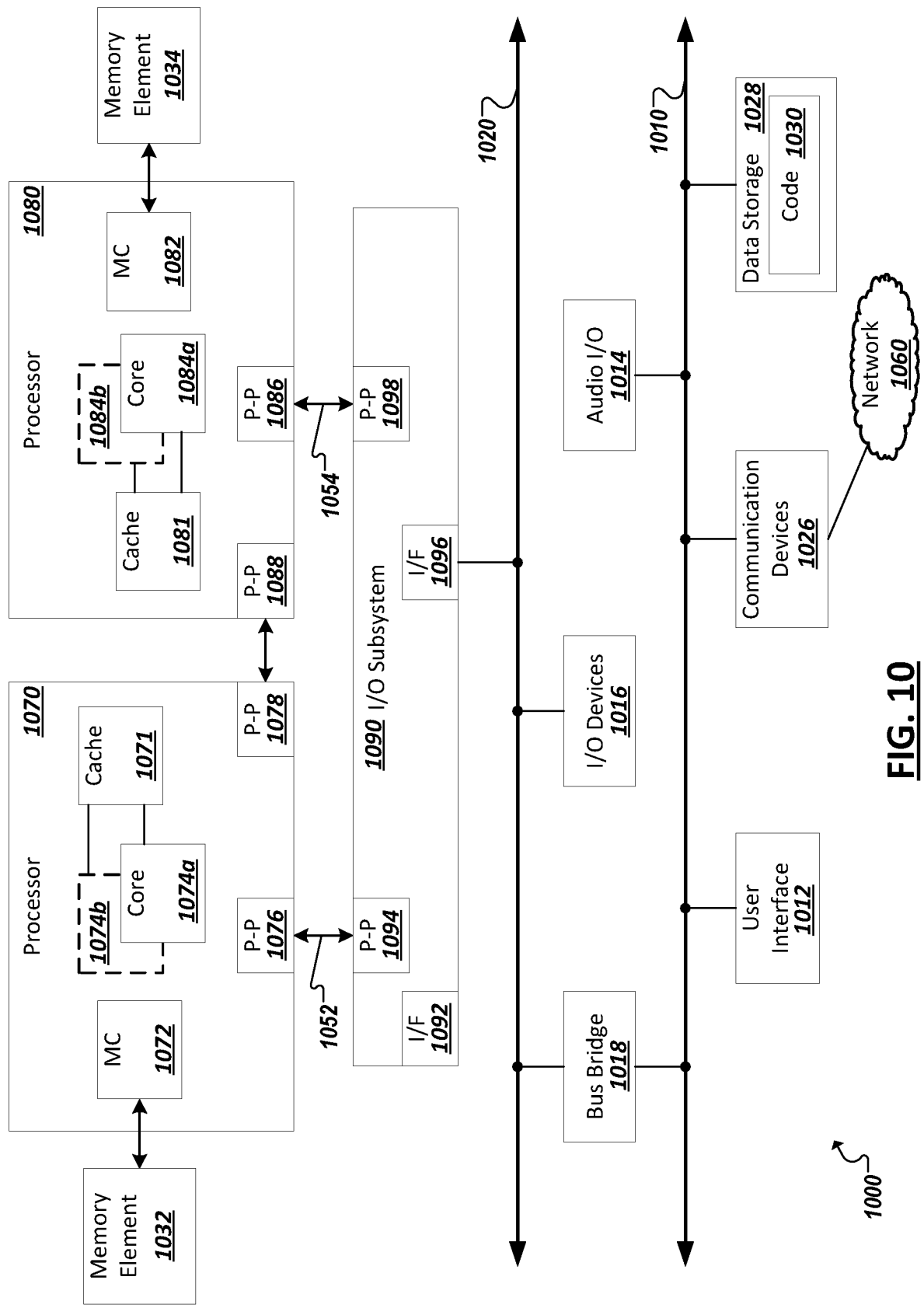
FIG. 10 illustrates a block diagram for an example embodiment of a computing system.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 illustrates a block diagram for an example embodiment of a processor 900. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 may also include register renaming logic and scheduling logic, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a block diagram for an example embodiment of a computing system 1000. Computing system 1000 is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification.

One or more embodiments may provide at least one machine accessible storage medium having instructions stored thereon, the instructions when executed on a machine, cause the machine to: receive, via a communications network, context information for a first set of one or more edge devices, wherein the context information identifies an operating environment of the first set of edge devices based on information from one or more sensors; receive, via the communications network, workload information for a second set of one or more edge devices; determine workload assignments for the first set of edge devices based on the context information for the first set of edge devices and based on the workload information for the second set of edge devices; and transmit, via the communications network, the workload assignments to the first set of edge devices.

In one example, the first set of edge devices and the second set of edge devices are configured to connect to the communications network at an edge of the communications network.

In one example, the context information for the first set of edge devices comprises edge device resource availability.

In one example, the context information for the first set of edge devices comprises edge device resource capabilities.

In one example, the instructions further cause the machine to: receive, from a broker managing a third set of one or more edge devices, context information for the third set of edge devices, wherein the context information identifies an operating environment of the third set of edge devices based on information from one or more sensors; determine workload assignments for the third set of edge devices based on the context information for the third set of edge devices and based on the workload information for the second set of edge devices; and transmit the workload assignments for the third set of edge devices to the broker managing the third set of edge devices.

In one example, the instructions further cause the machine to transmit, via an out-of-band interface, workload assignments for a third set of one or more edge devices to a broker managing the third set of edge devices.

In one example, a broker manages the first set of edge devices and the second set of edge devices.

In one example, the broker is a centralized broker.

In one example, the broker is a distributed broker.

In one example, the broker is an inter-edge broker.

In one example, the broker is a federated broker.

In one example, the instructions that cause the machine to determine workload assignments for the first set of edge devices based on the context information for the first set of edge devices and based on the workload information for the second set of edge devices further cause the machine to determine the workload assignments for the first set of edge devices based on a service level agreement.

One or more embodiments may provide an apparatus comprising circuitry, wherein the circuitry is configured to: receive, via a communications network, context information for a first set of one or more edge devices, wherein the context information identifies an operating environment of the first set of edge devices based on information from one or more sensors; receive, via the communications network, workload information for a second set of one or more edge devices; determine workload assignments for the first set of edge devices based on the context information for the first set of edge devices and based on the workload information for the second set of edge devices; and transmit, via the communications network, the workload assignments to the first set of edge devices.

In one example, the first set of edge devices and the second set of edge devices are configured to connect to the communications network at an edge of the communications network.

In one example, the context information for the first set of edge devices comprises edge device resource availability.

In one example, the context information for the first set of edge devices comprises edge device resource capabilities.

In one example, the circuitry is further configured to: receive, from a broker managing a third set of one or more edge devices, context information for the third set of edge devices, wherein the context information identifies an operating environment of the third set of edge devices based on information from one or more sensors; determine workload assignments for the third set of edge devices based on the context information for the third set of edge devices and based on the workload information for the second set of edge devices; and transmit the workload assignments for the third set of edge devices to the broker managing the third set of edge devices.

In one example, the circuitry is further configured to transmit, via an out-of-band interface, workload assignments for a third set of one or more edge devices to a broker managing the third set of edge devices.

In one example, a broker manages the first set of edge devices and the second set of edge devices.

In one example, the circuitry configured to determine workload assignments for the first set of edge devices based on the context information for the first set of edge devices and based on the workload information for the second set of edge devices is further configured to determine the workload assignments for the first set of edge devices based on a service level agreement.

One or more embodiments may provide a system, comprising: a processor; a memory; logic, when executed by the processor, configured to: receive, via a communications network, context information for a first set of one or more edge devices, wherein the context information identifies an operating environment of the first set of edge devices based on information from one or more sensors; receive, via the communications network, workload information for a second set of one or more edge devices; determine workload assignments for the first set of edge devices based on the context information for the first set of edge devices and based on the workload information for the second set of edge devices; and transmit, via the communications network, the workload assignments to the first set of edge devices.

In one example, the first set of edge devices and the second set of edge devices are configured to connect to the communications network at an edge of the communications network.

In one example, the logic is further configured to: receive, from a broker managing a third set of one or more edge devices, context information for the third set of edge devices, wherein the context information identifies an operating environment of the third set of edge devices based on information from one or more sensors; determine workload assignments for the third set of edge devices based on the context information for the third set of edge devices and based on the workload information for the second set of edge devices; and transmit the workload assignments for the third set of edge devices to the broker managing the third set of edge devices.

One or more embodiments may provide a method, comprising: receiving, via a communications network, context information for a first set of one or more edge devices, wherein the context information identifies an operating environment of the first set of edge devices based on information from one or more sensors; receiving, via the communications network, workload information for a second set of one or more edge devices; determining workload assignments for the first set of edge devices based on the context information for the first set of edge devices and based on the workload information for the second set of edge devices; and transmitting, via the communications network, the workload assignments to the first set of edge devices.

In one example, the first set of edge devices and the second set of edge devices are configured to connect to the communications network at an edge of the communications network.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having instructions stored thereon, the instructions when executed on a machine, cause the machine to:
   receive, via a communications network, sensor data captured by a plurality of Internet-of-Things (IoT) sensor devices, wherein the sensor data is indicative of an external environment detected by the IoT sensor devices;
   receive, via the communications network, context information associated with a set of edge devices, wherein each edge device in the set comprises one or more compute resources, and wherein the context information indicates:
      a type of the one or more compute resources; and
      a current resource utilization of the one or more compute resources;
   determine, based on the sensor data and the context information, workload assignments for at least a subset of edge devices from the set of edge devices, wherein the workload assignments assign processing of the sensor data across the subset of edge devices; and
   transmit, via the communications network, the sensor data to the subset of edge devices based on the workload assignments, wherein each edge device in the subset is to process a portion of the sensor data based on the workload assignments.

2. The storage medium of claim 1, wherein the set of edge devices is configured to connect to the communications network at an edge of the communications network.

3. The storage medium of claim 1, wherein:
   the set of edge devices comprises a first set of edge devices and a second set of edge devices;
   the instructions that cause the machine to receive, via the communications network, the context information associated with the set of edge devices further cause the machine to:
      receive, from the first set of edge devices, the context information associated with the first set of edge devices; and
      receive, from a broker managing the second set of edge devices, the context information associated with the second set of edge devices;
   the instructions that cause the machine to determine, based on the sensor data and the context information, the workload assignments for at least the subset of edge devices from the set of edge devices further cause the machine to:
      determine a first set of workload assignments for a first subset of edge devices from the first set of edge devices, wherein the first set of workload assignments assigns processing of a first portion of the sensor data across the first subset of edge devices; and determine a second set of workload assignments for a second subset of edge devices from the second set of edge devices, wherein the second set of workload assignments assigns processing of a second portion of the sensor data across the second subset of edge devices;

the instructions that cause the machine to transmit, via the communications network, the sensor data to the subset of edge devices based on the workload assignments further cause the machine to:

transmit the first portion of the sensor data to the first subset of edge devices based on the first set of workload assignments; and transmit the second portion of the sensor data to the broker managing the second subset of edge devices, wherein the broker is to transmit the second portion of the sensor data to the second subset of edge devices based on the second set of workload assignments.

4. The storage medium of claim 1, wherein the instructions further cause the machine to transmit, via an out-of-band interface, workload assignments for a second set of edge devices to a broker managing the second set of edge devices.

5. The storage medium of claim 1, wherein the set of IoT sensor devices and the set of edge devices are managed by a broker.

6. The storage medium of claim 5, wherein the broker is a centralized broker.

7. The storage medium of claim 5, wherein the broker is a distributed broker.

8. The storage medium of claim 5, wherein the broker is an inter-edge broker.

9. The storage medium of claim 5, wherein the broker is a federated broker.

10. The storage medium of claim 1, wherein the instructions that cause the machine to determine, based on the sensor data and the context information, the workload assignments for at least the subset of edge devices from the set of edge devices further cause the machine to determine the workload assignments based on a service level requirement.

11. A processing device, wherein the processing device comprises circuitry to:

receive, over a network, sensor data captured by a plurality of Internet-of-Things (IoT) sensor devices, wherein the sensor data is indicative of an external environment detected by the IoT sensor devices;

receive, over the network, context information associated with a set of edge devices, wherein each edge device in the set comprises one or more compute resources, and wherein the context information indicates:
a type of the one or more compute resources; and
a current resource utilization of the one or more compute resources;

determine, based on the sensor data and the context information, workload assignments for at least a subset of edge devices from the set of edge devices, wherein the workload assignments assign processing of the sensor data across the subset of edge devices; and transmit, over the network, the sensor data to the subset of edge devices based on the workload assignments, wherein each edge device in the subset is to process a portion of the sensor data based on the workload assignments.

12. The processing device of claim 11, wherein:
the set of edge devices comprises a first set of edge devices and a second set of edge devices;
the circuitry to receive, over the network, the context information associated with the set of edge devices is further to:
receive, from the first set of edge devices, the context information associated with the first set of edge devices; and
receive, from a broker managing the second set of edge devices, the context information associated with the second set of edge devices;
the circuitry to determine, based on the sensor data and the context information, the workload assignments for at least the subset of edge devices from the set of edge devices is further to:
determine a first set of workload assignments for a first subset of edge devices from the first set of edge devices, wherein the first set of workload assignments assigns processing of a first portion of the sensor data across the first subset of edge devices; and
determine a second set of workload assignments for a second subset of edge devices from the second set of edge devices, wherein the second set of workload assignments assigns processing of a second portion of the sensor data across the second subset of edge devices;
the circuitry to transmit, over the network, the sensor data to the subset of edge devices based on the workload assignments is further to:
transmit the first portion of the sensor data to the first subset of edge devices based on the first set of workload assignments; and
transmit the second portion of the sensor data to the broker managing the second subset of edge devices, wherein the broker is to transmit the second portion of the sensor data to the second subset of edge devices based on the second set of workload assignments.

13. The processing device of claim 11, wherein the circuitry is further to transmit, via an out-of-band interface, workload assignments for a second set of edge devices to a broker managing the second set of edge devices.

14. A system, comprising:
network interface circuitry to communicate over a network; and
processing circuitry to:
receive, via the network interface circuitry, sensor data captured by a plurality of Internet-of-Things (IoT) sensor devices, wherein the sensor data is indicative of an external environment detected by the IoT sensor devices;
receive, via the network interface circuitry, context information associated with a set of edge devices, wherein each edge device in the set comprises one or more compute resources, and wherein the context information indicates:
a type of the one or more compute resources; and
a current resource utilization of the one or more compute resources;
determine, based on the sensor data and the context information, workload assignments for at least a subset of edge devices from the set of edge devices, wherein the workload assignments assign processing of the sensor data across the subset of edge devices; and transmit, via the network interface circuitry, the sensor data to the subset of edge devices based on the workload assignments, wherein each edge device in the subset is to process a portion of the sensor data based on the workload assignments.

15. The system of claim 14, wherein:
the set of edge devices comprises a first set of edge devices and a second set of edge devices;
the processing circuitry to receive, via the communications network, the context information associated with the set of edge devices is further to:
receive, from the first set of edge devices, the context information associated with the first set of edge devices; and
receive, from a broker managing the second set of edge devices, the context information associated with the second set of edge devices;
the processing circuitry to determine, based on the sensor data and the context information, the workload assignments for at least the subset of edge devices from the set of edge devices is further to:
determine a first set of workload assignments for a first subset of edge devices from the first set of edge devices, wherein the first set of workload assignments assigns processing of a first portion of the sensor data across the first subset of edge devices; and
determine a second set of workload assignments for a second subset of edge devices from the second set of edge devices, wherein the second set of workload assignments assigns processing of a second portion of the sensor data across the second subset of edge devices;
the processing circuitry to transmit, via the communications network, the sensor data to the subset of edge devices based on the workload assignments is further to:
transmit the first portion of the sensor data to the first subset of edge devices based on the first set of workload assignments; and
transmit the second portion of the sensor data to the broker managing the second subset of edge devices, wherein the broker is to transmit the second portion of the sensor data to the second subset of edge devices based on the second set of workload assignments.

16. A method, comprising:
receiving, via a communications network, sensor data captured by a plurality of Internet-of-Things (IoT) sensor devices, wherein the sensor data is indicative of an external environment detected by the IoT sensor devices;
receiving, via the communications network, context information associated with a set of edge devices, wherein each edge device in the set comprises one or more compute resources, and wherein the context information indicates:
a type of the one or more compute resources; and
a current resource utilization of the one or more compute resources;
determining, based on the sensor data and the context information, workload assignments for at least a subset of edge devices from the set of edge devices, wherein the workload assignments assign processing of the sensor data across the subset of edge devices; and
transmitting, via the communications network, the sensor data to the subset of edge devices based on the workload assignments, wherein each edge device in the subset is to process a portion of the sensor data based on the workload assignments.

17. The storage medium of claim 1, wherein the context information further indicates resource capabilities of the one or more compute resources.

18. The processing device of claim 11, wherein the context information further indicates resource capabilities of the one or more compute resources.

19. The system of claim 14, wherein the context information further indicates resource capabilities of the one or more compute resources.

20. The method of claim 16, wherein the context information further indicates resource capabilities of the one or more compute resources.

* * * * *